United States Patent
Chen et al.

(10) Patent No.: US 7,773,559 B2
(45) Date of Patent: Aug. 10, 2010

(54) TRAFFIC ENGINEERING ON WIRELESS MESH NETWORKS

(75) Inventors: Wei-Peng Chen, Santa Clara, CA (US); Ching-Fong Su, Milpitas, CA (US)

(73) Assignee: Fujitsu Limited, Kawasaki (JP)

( * ) Notice: Subject to any disclaimer, the term of this patent is extended or adjusted under 35 U.S.C. 154(b) by 768 days.

(21) Appl. No.: 11/684,885

(22) Filed: Mar. 12, 2007

(65) Prior Publication Data
US 2008/0225717 A1 Sep. 18, 2008

(51) Int. Cl.
*H04W 4/00* (2009.01)
(52) U.S. Cl. .................. 370/329; 370/254; 455/452.2
(58) Field of Classification Search ............ None
See application file for complete search history.

(56) References Cited

U.S. PATENT DOCUMENTS

| | | | | |
|---|---|---|---|---|
| 6,493,377 B2 | 12/2002 | Schilling et al. | ............ | 375/130 |
| 2005/0208949 A1* | 9/2005 | Chiueh | ............ | 455/452.2 |
| 2005/0265258 A1* | 12/2005 | Kodialam et al. | ............ | 370/254 |
| 2007/0153702 A1* | 7/2007 | Alicherry et al. | ............ | 370/252 |

\* cited by examiner

*Primary Examiner*—Erika A Gary
(74) *Attorney, Agent, or Firm*—Baker Botts L.L.P.

(57) ABSTRACT

Techniques are described for intelligently allocating bandwidth in a wireless mesh network. The wireless mesh network includes a nodes and links interconnecting the nodes. In order to increase capacity and avoid congestion in the network, a network administrator may regulate network traffic by adjusting various parameters that control the operation of network nodes. The network administrator may identify topology information, which indicates a configuration of the nodes and links, and a traffic matrix, which indicates a relative traffic demand weighting for each source node-destination node pair. From this information, the network administrator may calculate a bandwidth assignment for each link. Network administrator may use the bandwidth assignments to calculate a parameter for each node. That parameter may affect the amount of bandwidth used by a node. These parameters may be transmitted to their respective nodes.

25 Claims, 3 Drawing Sheets

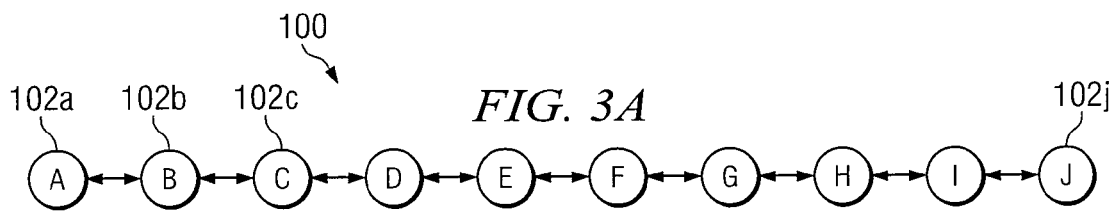
*FIG. 3A*
*FIG. 3B*
| NODE | A | B | C | D | E | F | G | H | I | J |
|------|---|---|---|---|---|---|---|---|---|---|
| TXOP | 1 | 3.691 | 5.852 | 7.361 | 8.084 | 8.084 | 7.361 | 5.852 | 3.691 | 1 |
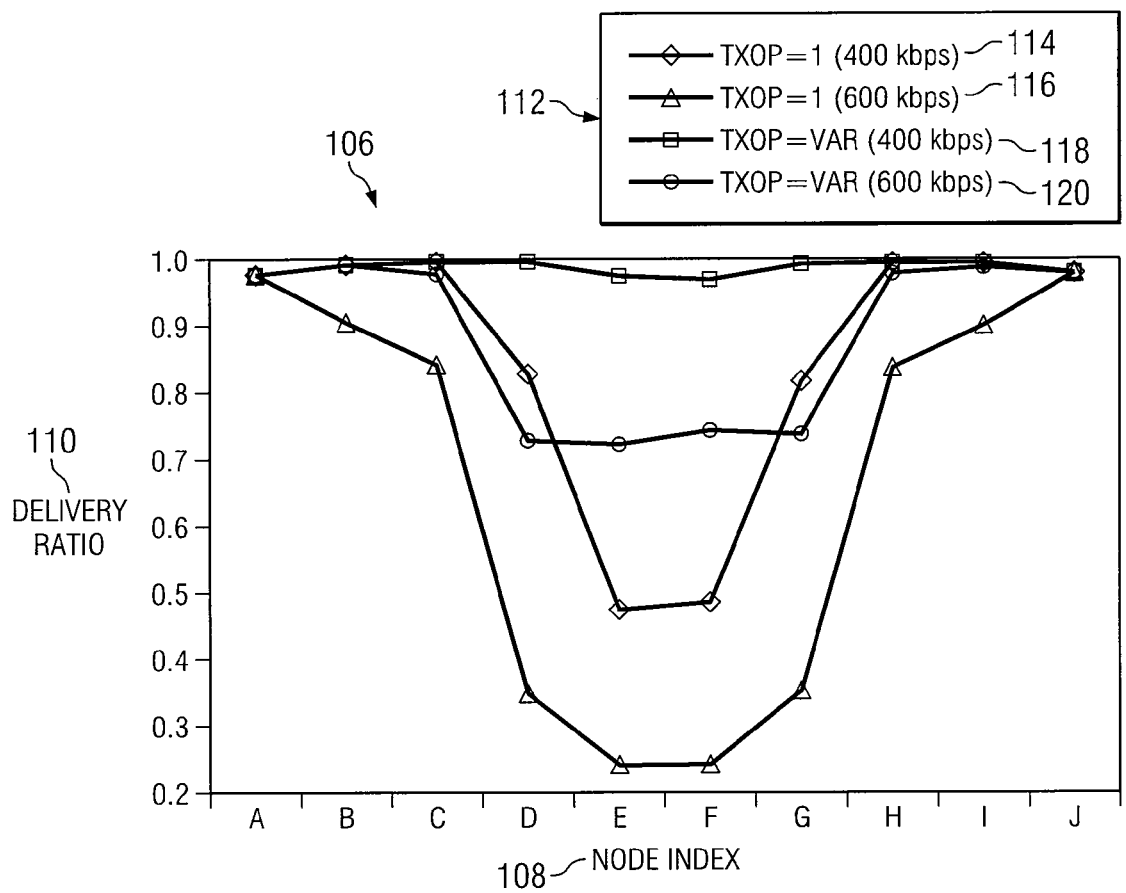
*FIG. 3C*

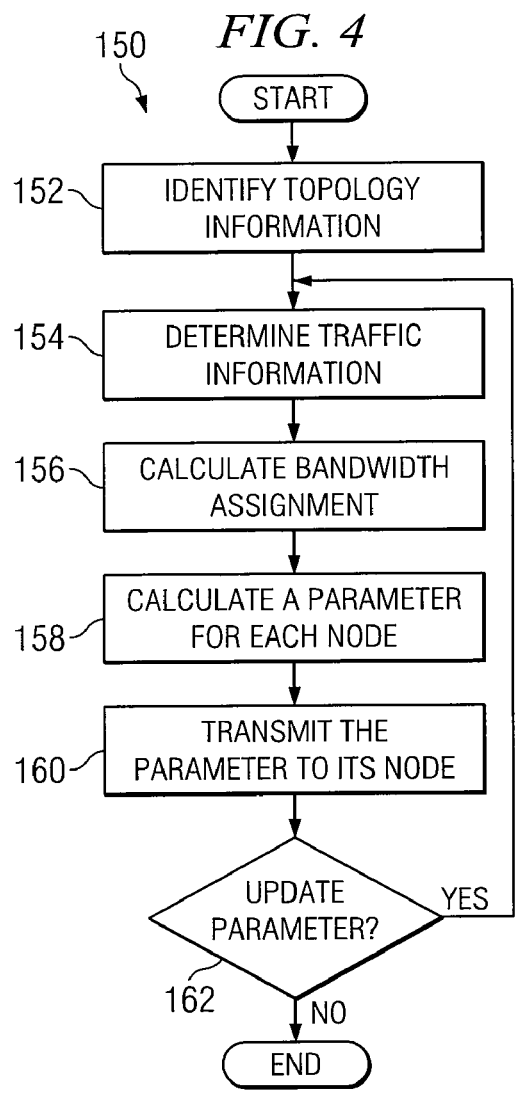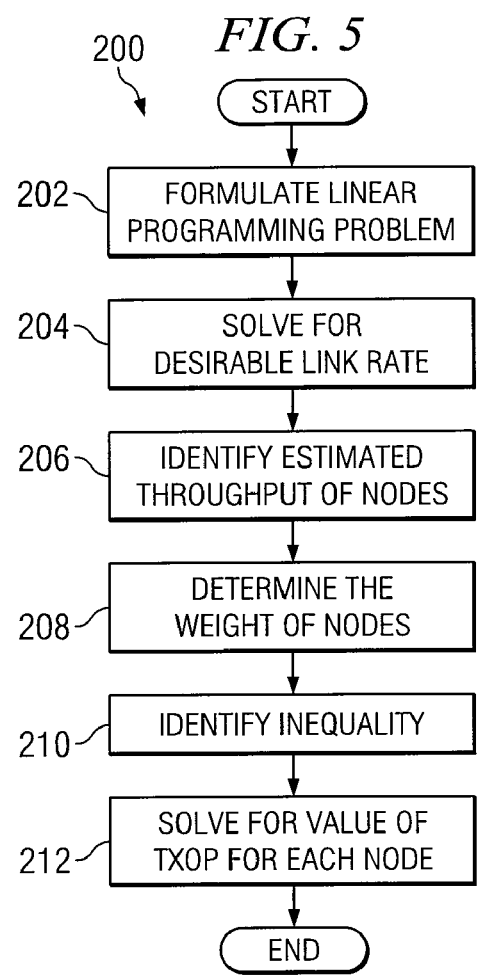

TRAFFIC ENGINEERING ON WIRELESS MESH NETWORKS

TECHNICAL FIELD OF THE INVENTION

The present invention relates generally to networking and, more particularly, to traffic engineering on wireless mesh networks.

BACKGROUND OF THE INVENTION

The use of wireless mesh networks has increased in recent years. These networks may be formed with a number of nodes that are interconnected wirelessly in a mesh manner. Unlike the traditional wireless local area network (LAN), these nodes may be responsible for both forwarding the data traffic to and from mobile devices and relaying transit traffic among the nodes. As a result, these nodes may form a wireless multi-hop network. The throughput of such networks is an important issue for network design and planning.

SUMMARY

In accordance with the present invention, techniques for traffic engineering on wireless mesh networks are described. According to particular embodiments, these techniques intelligently allocate bandwidth in a wireless mesh network.

According to a particular embodiment, a method of allocating bandwidth in a wireless mesh network includes identifying topology information. The topology information indicates a configuration of a plurality of wireless nodes and a plurality of wireless links interconnecting the wireless nodes to form a wireless mesh network. The method determines a traffic matrix for the wireless mesh network. The traffic matrix indicates, for each of the nodes to each of the other nodes as source node-destination node pairs, a relative traffic demand weighting for the source node-destination node pair as compared with each of the other source node-destination node pairs. The method calculates a bandwidth assignment for each wireless link using the topology information and the traffic matrix and calculates a parameter for each wireless node from the bandwidth assignments. The parameter affects an amount of bandwidth used by the wireless node. The method transmits each parameter to its corresponding wireless node.

Embodiments of the invention provide various technical advantages. For example, these techniques may increase the throughput of a wireless network. By allocating wireless resources more intelligently, congestion problems in high-traffic areas may be compensated for and reduced. In certain embodiments, interference present in wireless networks can be recognized and remedied by modifying bandwidth parameters. Interference may cause a node to gain access to a channel less often, but these methods may reduce the effect of interference by allowing the node to transmit on the channel longer after gaining access, according it a larger effective bandwidth. In particular embodiments, a set of interfering nodes are given relatively "fair" access to a channel by allocating bandwidth among the set of nodes. In some embodiments, bandwidth allocations in the network are accomplished by modifying parameters already found in existing standards, such as IEEE 802.11 wireless communication protocols. This may allow a wireless network to be fully compatible with an established standard while requiring minimal changes to existing infrastructures. Also, in particular embodiments, these techniques adapt current wireless networking standards and techniques to the complexities inherent in wireless mesh network topologies.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is made to the following description taken in conjunction with the accompanying drawings in which:

FIGS. 3A-C illustrate the topology of an example wireless mesh network, parameters selected to allocate bandwidth among network nodes, and the simulated results of that bandwidth allocation;

FIG. 4 is a flowchart illustrating a method by which a network administrator may allocate bandwidth in a wireless mesh network; and FIG. 5 is a flowchart illustrating a specific embodiment of a method of calculating link bandwidth assignments and calculating parameters for nodes.

DETAILED DESCRIPTION OF THE DRAWINGS

Figure 1:
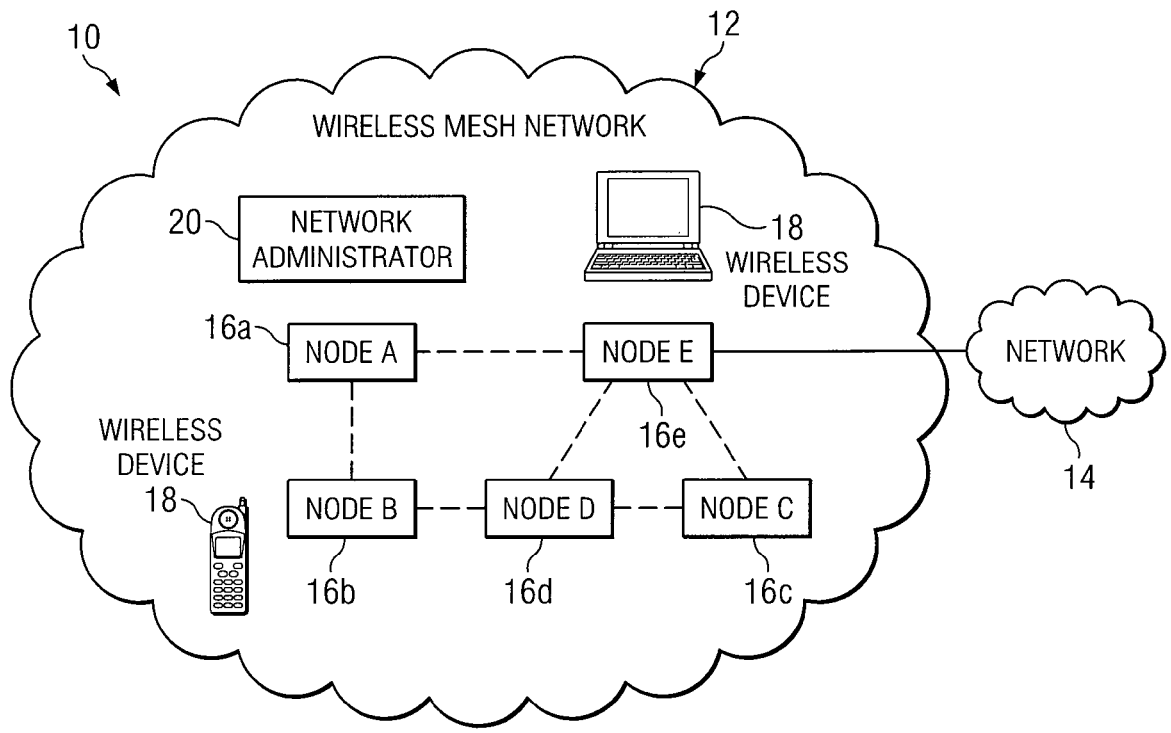
FIG. 1 illustrates a system for intelligently allocating bandwidth in a wireless mesh network.

FIG. 1 illustrates a system, indicated generally at 10, for intelligently allocating bandwidth in a wireless mesh network. As illustrated, system 10 includes a wireless mesh network 12 and a network 14, which may interconnect using any suitable techniques or protocols. In general, the elements in wireless mesh network 12 interoperate to intelligently allocate bandwidth in wireless mesh network 12. In order to increase capacity and avoid congestion, a network administrator regulates network traffic by determining interference in wireless mesh network 12 and adjusting various parameters that control the operation of network nodes.

Wireless mesh network 12 is a logical depiction of a wireless network having a mesh topology. In the illustrated embodiment, wireless mesh network 12 includes nodes 16, wireless devices 18, and network administrator 20. While not illustrated, wireless mesh network 12 may include any other suitable devices to provide a wireless multi-hop network in which bandwidth is intelligently allocated. In particular embodiments, wireless mesh network 12 may be a private enterprise network allowing only authorized access, while, in other embodiments, wireless mesh network 12 may be a public network allowing general access.

In general, nodes 16 interconnect to form wireless mesh network 12. Each node 16 may transmit communications to other nodes 16 and mobile devices 18, and each node 16 may receive communications from other nodes 16 and mobile devices 18. In particular embodiments, nodes 16 receive management messages from network administrator 20. Nodes 16 may process theses messages and update transmission parameters, routing tables, and/or any other appropriate memory and/or procedures for complying with messages received from network administrator. In particular embodiments, nodes 16 communicate in compliance with protocols dictated by a standard, such as IEEE 802.11 or IEEE 802.16. In general, nodes 16 include any suitable collection of hardware, software, and controlling logic to transmit, receive, and/or process communications in wireless mesh network 12.

In the illustrated embodiment, wireless mesh network 12 includes nodes 16a, 16b, 16c, 16d, and 16e. Wireless links, indicated by the dotted lines, exist between: (1) nodes 16a and 16b, (2) nodes 16b and 16d, (3) nodes 16d and 16c, (4) nodes 16d and 16e, (5) nodes 16c and 16e, and (6) nodes 16e and 16a. In particular embodiments, nodes 16 have a limited range over which they can successfully communicate with other nodes 16, mobile devices 18, or other devices in wireless mesh network 12. For example, the range of node 16c may include nodes 16d and 16e, as indicated by the illustrated wireless links (dotted lines), but not include other nodes 16. Further, because nodes 16 communicate wirelessly, transmissions sent by one node 16 may interfere with communications between other nodes 16. In certain embodiments, this range of interference for a particular node 16 is larger than the range of communication for that node 16. For example, in a specific embodiment, each node 16 may be able to communicate with another node 16 up to 250 meters away, while each node 16 may interfere with other wireless communications up to 550 meters away. While wireless mesh network 12 is depicted and described as having five nodes, it is understood that wireless mesh network 12 may have any suitable number of nodes 16.

As illustrated, wireless mesh network 12 includes wireless devices 18, which allow users of those wireless devices 18 to send and receive voice, video, data, and/or any other appropriate communications. Wireless devices 18 may communicate through one or more of nodes 16 in order to connect to other wireless devices 18, other nodes 16, or other elements within wireless mesh network 12. In particular embodiments, wireless devices 18 communicate through one of nodes 16 in order to gain access to network 14 or another external network or device. In some embodiments, wireless devices include laptop computers, personal digital assistants (PDAs), VoIP phones, cell phones, or any other device suitable for communicating wirelessly within a network. While only two wireless devices 18 are shown in wireless mesh network 12, it is understood that wireless mesh network 12 may include any number of wireless devices 18.

Network 14 represents any suitable collection of hardware, software, and controlling logic for interconnecting communications devices. In the illustrated embodiment, network 14 is a network external to wireless mesh network 12. In a particular embodiment, network 14 may include one or multiple networks such as a telecommunications network, a satellite network, a cable network, local area networks (LANs), wide area networks (WANs), the internet, an Ethernet, and/or any other appropriate network.

In the illustrated embodiment, node 16e is connected to network 14 through a wired connection, illustrated with a solid line connecting the two. Through node 16e, other nodes 16 may communicate with network 14 or devices connected to network 14. In particular embodiments, node 16e relays messages between network 14 and elements within wireless mesh network 12, such as other nodes 16 and wireless devices 18. In certain embodiments, node 16e may connect to network 14 through a gateway and/or any other suitable devices, or node 16e may provide gateway functionality to support interoperation between disparate networks. While system 10 is illustrated as having only one network 14 connected to wireless mesh network 12 through node 16e, it is understood that system 10 may include any suitable number of networks 14 or other suitable devices or combinations of devices connected to wireless mesh network 12 in any appropriate manner.

Network administrator 20 determines information about wireless mesh network 12, processes that information, and instructs nodes 16 in order to intelligently allocate bandwidth in wireless mesh network 12. Network administrator 20 may communicate with nodes 16 in any suitable manner. In particular embodiments, network administrator 20 wirelessly communicates with nodes 16 within range and routes messages through those nodes 16 in order to reach other nodes 16 in wireless mesh network 12. In other embodiments, network administrator 20 is able to wirelessly communicate with each node 16 in wireless mesh network 12. In certain embodiments, network administrator 20 communicates with nodes 16 through a wired connection, not shown, or any other suitable methods. While illustrated as an independent device, network administrator 20 may be collocated with one of nodes 16. Network administrator 20 may include any suitable collection of hardware, software, and controlling logic to direct the intelligent allocation of bandwidth in wireless mesh network 12.

In operation, network administrator 20 identifies topology information for wireless mesh network 12. Network administrator 20 can potentially use the topology information to determine the presence, degree, and location of interference in wireless mesh network 12. In certain embodiments, external influences, such as devices, networks, etc., also cause interference in wireless mesh network 12. Topology information may also incorporate interference caused by these external influences. In particular embodiments, network administrator 20 determines traffic information for wireless mesh network 12. The traffic information may indicate the solicited traffic load between a source node 16 and a destination node 16. In some embodiments, traffic information is an estimate, while in other embodiments, traffic information represents actual traffic flow. As an example, network administrator 20 may determine traffic information by querying and observing the operation of wireless mesh network 12. Network administrator 20 may rely on other devices, such as nodes 16, to monitor and report traffic information. In particular embodiments, network administrator 20 may represent this traffic information as a traffic matrix showing the relative amount of traffic from each node 16 to every other node 16. The traffic matrix may show, for each pairing of a source node 16 and a destination node 16, a relative traffic demand weighting for the pair as compared with other pairings. The traffic matrix may be multiplied by a scalar value in order to determine the actual traffic load from each source node 16 and to each destination node 16 in wireless mesh network 12. Network administrator 20 may allocate bandwidth in order to maximize the value of that scalar. In certain embodiments, network administrator 20 uses traffic information to direct intelligent routing of packets through wireless mesh network 12.

Using topology information and traffic information, network administrator 20 calculates bandwidth assignments, potentially for each link in wireless mesh network 12. Each bandwidth assignment represents the desirable bandwidth for a particular link. In certain embodiments, network administrator 20 may simplify computations by using the throughput of nodes 16 rather than the throughput of links. In order to do so, network administrator 20 may calculate a bandwidth assignment for each node in wireless mesh network 12. After determining bandwidth assignments, network administrator 20 may calculate a parameter for each node 16 in wireless mesh network 12. These parameters may be sent to and incorporated by nodes 16. The value of this parameter may control the operation of a particular node 16 and dictate the bandwidth usage of that node 16, thereby enforcing the bandwidth allocations selected by network administrator 20. In particular embodiments, network administrator 20 calculates a parameter for each node 16 in order to have the bandwidth used by that link or node 16 approximate the corresponding bandwidth allocation.

When devices in wireless mesh network 12 communicate according to IEEE 802.11 wireless communication protocols, a number of parameters may be used to affect the actual bandwidth of different links and/or nodes 16 in a network. In networks using 802.11, network administrator 20 may alter values of TXOP (transmission opportunity) in order to affect the bandwidth usage of nodes 16. TXOP, a parameter specified by the 802.11 standard, represents the maximum interval over which a particular node 16 is allowed to send packets during one successful access of the medium. If the length of a packet to be transmitted is less than TXOP length, that node 16 is allowed to send more back-to-back packets until it reaches the limit. The original purpose of the TXOP parameter may be extended to assign bandwidth to certain nodes 16 in wireless mesh network 12 by selecting a value of TXOP for the different nodes 12. A larger TXOP value gives the corresponding node 16 more time to transmit packets once it has acquired the channel. A smaller TXOP value decreases the window in which a corresponding node 16 may transmit packets after that node 16 acquires the channel. Accordingly, network administrator 20 may calculate a TXOP value for nodes 16 in order to enforce the desired bandwidth allocation. In other embodiments, different 802.11 parameters can be used to affect effective bandwidth of nodes 16. For example, the IFS (interframe slot) and contention window may be modified to change the actual bandwidth of nodes 16 and/or links in wireless mesh network 12. By adjusting various parameters, network administrator 20 may control operation of nodes 16 to steer traffic, thus increasing capacity and avoiding congestion by taking into account interference.

While wireless mesh network 12 is described above with respect to 802.11 protocols, it is understood that devices in wireless mesh network 12 may communicate according to different protocols in other embodiments. For example, wireless mesh network 12 may operate according to WiMAX (or IEEE 802.16) wireless communication protocols. Network administrator 20 may use any appropriate parameters to modify the actual bandwidth of nodes in those embodiments.

Particular embodiments of a system for intelligently allocating bandwidth in a wireless mesh network have been described and are not intended to be all inclusive. While wireless mesh network 12 is depicted as containing a certain configuration and arrangement of elements, it should be noted that this is a logical depiction, and the components and functionality of wireless mesh network 12 may be combined, separated and distributed as appropriate both logically and physically. Also, the functionality of wireless mesh network 12 may be provided by any suitable collection and arrangement of components. While described as a "parameter," it is understood the term as used herein encompasses, without limitation any suitable parameter, characteristic, algorithm, function, table, protocol, variable, etc.

Figure 2:
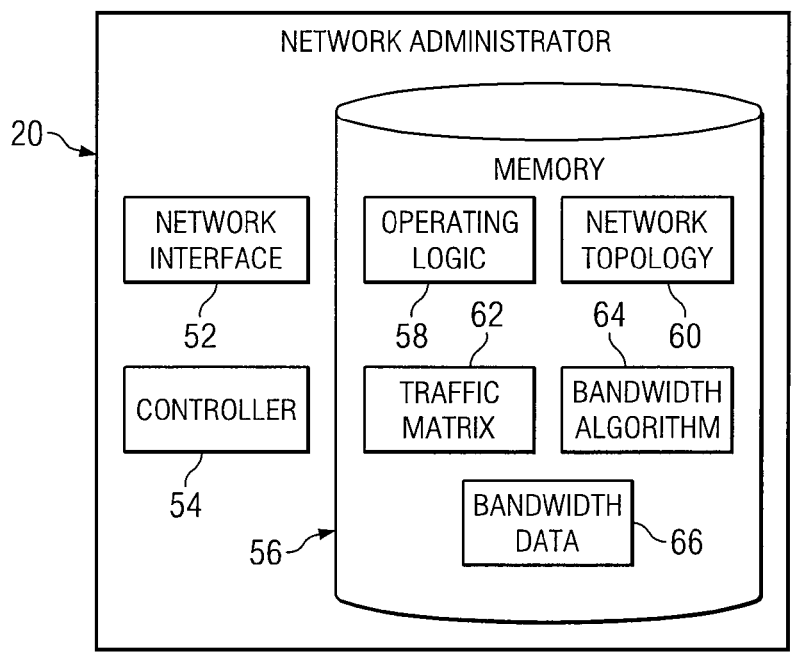
FIG. 2 illustrates a network administrator that determines the allocation of bandwidth in the wireless mesh network.

FIG. 2 illustrates a network administrator 20 that determines the allocation of bandwidth in wireless mesh network 12. As illustrated, network administrator 20 includes a network interface 52, a controller 54, and memory 56.

Network interface 52 supports communications with other elements of system 10. In particular embodiments, network interface 52 is a wireless interface for communicating with nodes 16 in wireless mesh network 12. Network interface 52 may also communicate wirelessly with other devices in wireless mesh network 12. In certain embodiments, network interface 52 is operable to connect to multiple networks, including wireless mesh network 12. For example, network interface 52 may connect to a wired network, such as a private Ethernet or the Internet (not shown). While described and illustrated as a single component within network administrator 20, it is understood that this is a logical depiction. Network interface 52 may be comprised of any suitable components, hardware, software, and/or logic for interfacing network administrator 20 with other elements of system 10.

In general, controller 54 controls the operations, calculations, and functions of network administrator 20. Controller 54 may process information received by network administrator through network interface 52. In particular embodiments, controller 54 loads functions, algorithms, and data from memory in order to calculate bandwidth assignments and parameters for nodes 16. While depicted as a single element in network administrator 20, it is understood that the functions of controller 54 may be performed by one or many elements. Controller 54 may have any suitable additional functionality to control the operation of network administrator 20.

Memory 56 stores data and algorithms used by network administrator 20. In the illustrated embodiment, memory 56 contains operating logic 58, network topology 60, traffic matrix 62, bandwidth algorithm 64, and bandwidth data 66. Operating logic 58 includes any suitable programs, software, logic, or circuitry capable when executed to control the operation of various elements in network administrator 20 and to perform any other functions required by network administrator 20.

Network topology 60 includes information regarding the topology of wireless mesh network 12. In particular embodiments, topology information includes the number of nodes 16, the configuration of nodes 16, the signal strength of each node 16, and/or any other suitable information. Network topology 60 may indicate the amount of interference through various parts of wireless mesh network 12. In certain embodiments, network administrator 20 uses network topology 60 to determine desired bandwidth allocation. In some embodiments, network administrator 20 uses network topology 60 to determine how packets should be routed through wireless mesh network 12.

Traffic matrix 62 includes information regarding the amount of traffic in various portions of wireless mesh network 12. Traffic matrix 62 may reflect actual wireless traffic, a traffic estimate (e.g., through simulations), historical data, or suitable combinations of traffic information. Network administrator 20 updates traffic matrix 62 when appropriate based on the types of data maintained and the techniques for obtaining the information. In certain embodiments, traffic matrix 62 may indicate the relative flow of packets from each source node 16 to each destination node 16. Thus, traffic matrix 62 may be represented as a two dimensional array containing flow to and from each node 16 in wireless mesh network 12.

Bandwidth algorithm 64 includes formulas and algorithms employed by network administrator 20 to calculate bandwidth allocations and the parameters for nodes 16. For example, bandwidth algorithm 64 may contain an algorithm for processing network topology 60 and traffic matrix 62, potentially in conjunction with other data, to derive bandwidth allocation. Similarly, bandwidth algorithm 64 may contain an algorithm that inputs the bandwidth allocation to determine parameter values for nodes 16. Bandwidth data 66 stores the calculated bandwidth allocation and parameter values. In particular embodiments, bandwidth algorithm 64 includes formulas similar to those described below with respect to FIG. 5. In general, memory 56 may be formed from any suitable combination and configuration of storage elements to store the data and algorithms used by network administrator 20.

While memory 56 is illustrated and described as a single element containing a particular configuration and arrangement of modules, it should be noted that this is a logical depiction and the components and functionality of memory 56 may include any suitable elements located in one or more physical locations. Memory 56 may store any information used by network administrator 20.

In operation, network administrator 20 may identify information regarding the topology of wireless mesh network 12 by accessing information stored in network topology 60. Network administrator 20 may also determine traffic information for wireless mesh network 12 by accessing traffic matrix 62. In some embodiments, network administrator 20 determines traffic information after receiving and processing status messages from one, many, or all nodes 16 in wireless mesh network 12. Network administrator 20 may query other devices in wireless mesh network 12 for information regarding the traffic flow in wireless mesh network 12. In other embodiments, network administrator 20 receives traffic information from a separate device or element. Network administrator 20 may receive this information periodically, in response to a request sent by network administrator 20, or after changes in traffic information.

Network administrator may use network topology 60, traffic matrix 62, and bandwidth algorithm 64 to calculate bandwidth allocation in wireless mesh network 12. The bandwidth allocation may indicate a desired usage of bandwidth for each link and/or each node 16 in wireless mesh network 12. In particular embodiments, the bandwidth allocation indicates a desired bandwidth to be used by a portion of wireless mesh network 12. For example, if the traffic matrix 62 indicates that significant traffic exists in a particular part of wireless mesh network 12, then network administrator 20 may calculate bandwidth allocation for that part of wireless mesh network 12. Network administrator may store the bandwidth allocation in bandwidth data 66.

Using the bandwidth assignment and bandwidth algorithm 64, network administrator 20 may calculate one or more parameters to affect bandwidth in wireless mesh network 12. Network administrator 20 may select a different parameter for one or more nodes 16 so that the bandwidth used by the corresponding node 16 approximates a desired bandwidth allocation. In certain embodiments, network administrator 20 selects a TXOP value for each node 16. When a particular node 16 is assigned a larger TXOP value, that node 16 may have more time to transmit data after it acquires the channel, resulting in that node 16 having more bandwidth. A smaller TXOP value will cause a different node 16 to have less time to transmit data, resulting in that node 16 having less bandwidth. In certain embodiments, network administrator 20 calculates a value for TXOP so that the bandwidth used approximates the desired bandwidth allocation. A particular embodiment of this calculation is described with respect to FIG. 5. In other embodiments, different 802.11 parameters can be used to affect the effective bandwidth of nodes 16. For example, the IFS (interframe slot) and contention window may be modified to change effective bandwidth of each node 16. Where appropriate, network administrator 20 may use different parameters to set or adjust the bandwidth consumed by each node and/or link. Bandwidth algorithm 64 may store algorithms, formulas, etc. for a variety of these parameters.

In particular embodiments, network administrator 20 also works to improve throughput by controlling routing of packets through wireless mesh network 12. For example, network administrator 20 may monitor, populate, adjust, or otherwise control packet routing tables maintained by nodes 16. As a particular example, network administrator 20 may evaluate traffic matrix 62 and determine that a high volume of traffic is traveling from node 16d to node 16e and from node 16b to node 16e. After making that determination, network administrator 20 may evaluate network topology 60 to determine how packets from node 16b to node 16e should be routed. In the network illustrated in FIG. 1, these packets can be routed through either node 16a or node 16d. If node 16a has a lower volume of traffic than node 16d, network administrator 20 may update the routing tables of nodes 16 to indicate that traffic from node 16b to node 16e should be routed through node 16a rather than node 16d. While described with a simple example, this concept may be applied to a variety of routing designs.

Particular embodiments of a network administrator have been described and are not intended to be all inclusive. While network administrator 20 is depicted as a single element containing a certain configuration and arrangement of elements, it should be noted that this is a logical depiction, and the components and functionality of network administrator 20 may be combined, separated and distributed as appropriate both logically and physically. Also, the functionality of network administrator 20 may be provided by any suitable collection and arrangement of components. In particular embodiments, network administrator 20 may be collocated with one of nodes 16. In some embodiments, the functionality of network administrator 20 is distributed in some or all of nodes 16 in wireless mesh network 12. In certain embodiments, network administrator 20 is located outside wireless mesh network 12. Network administrator 20 may intelligently allocate bandwidth for multiple wireless mesh networks. Additionally, network administrator 20 may include any other suitable components, elements, devices, and functionality. For example, network administrator 20 may include a user interface to allow an individual to monitor and potentially control traffic flow and/or bandwidth allocations in wireless mesh network 12. In sum, the functions performed by the various components of network administrator 20 may be accomplished by any suitable devices to intelligently allocate bandwidth in wireless mesh network 12.

FIGS. 3A-C illustrate the topology of an example wireless mesh network, parameters selected to allocate bandwidth among network nodes, and the simulated results of that bandwidth allocation. FIG. 3A shows an example wireless mesh network 100 that includes ten nodes: nodes 102a-j. In the illustrated embodiment, nodes 102 are spaced 250 meters apart and can communicate with nodes 102 spaced up to 250 meters away. Accordingly, nodes 102 communicate only with adjacent nodes 102, as indicated by the arrows. As illustrated, node 102a can only communicate with node 102b, while node 102b can communicate with either node 102a or node 102c. Also, nodes 102 may create interference up to 550 meters away. Wireless mesh network 100 also includes a network administrator (not shown), which may be network administrator 20.

FIG. 3B shows a table 104 which includes parameters selected for nodes 102. In the illustrated embodiment, nodes 102 transmit and receive messages according to the IEEE 802.11 wireless communication protocols. Each node 102 may establish a constant-bit-rate (CBR) connection to each of its adjacent nodes 102. Table 104 shows a value of TXOP for each of nodes 102, calculated according to the formulas and method described with respect to FIG. 5.

In table 104, nodes 102a and 102j are assigned a TXOP value of 1; nodes 102b and 102i are assigned a TXOP value of 3.691; nodes 102c and 102h are assigned a TXOP value of 5.852; nodes 102d and 102g are assigned a TXOP value of 7.361; and nodes 102e and 102f are assigned a TXOP value of 8.084. Nodes 102 in the center of the mesh (e.g., nodes 102e and 102f) may encounter more interference because they may receive interference from more nodes 102 in wireless mesh network 100; however, nodes 102 on the outside edges of wireless mesh network (e.g., nodes 102a and 102j) may receive less interference from other nodes 102. Table 104 shows that those central nodes 102 are assigned a larger value for TXOP than outside nodes 102. Accordingly, the bandwidth allocations shown in table 104 may allow all nodes to use the available bandwidth in a more "fair" manner.

FIG. 3C contains a graph 106 that shows the effect of the sample TXOP assignments listed in table 104. Graph 106 was formed by applying these TXOP assignments to nodes 102 in a simulated wireless mesh network 100. Graph 106 includes a horizontal axis 108 listing the node index corresponding to nodes 102. Graph 106 also includes a vertical axis 110 showing the delivery ratio, i.e. the ratio of delivered packets to the total number of packets.

The key 112 explains the significance of the four lines shown in graph 106. The top line 114 in key 112 shows the delivery ratio for the various nodes 102 when TXOP remains the same for all nodes and the transmission data rate is 400 kilobits per second. The next line 116 in key 112 shows the delivery ratio for the various nodes 102 when TXOP remains the same for all nodes and the transmission data rate is 600 kilobits per second. The following line 118 in key 112 shows the delivery ratio for the various nodes 102 when TXOP is set to the TXOP value reflected by table 104 and the transmission data rate is 400 kilobits per second. Finally, the bottom line 120 in key 112 shows the delivery ratio for the various nodes 102 when TXOP is set to the TXOP value reflected by table 104 and the transmission data rate is 600 kilobits per second. As can be seen from graph 106 the delivery ratio for nodes 102 with the most interference is dramatically increased by setting the TXOP value of those nodes 102 to a larger value than the TXOP value of other nodes 102.

Particular embodiments of wireless mesh network have been described and are not intended to be all inclusive. While wireless mesh network 100 is depicted as containing a certain configuration and arrangement of elements, it should be noted that this is merely an example. Likewise, the parameter identified (i.e., TXOP) and the values of that parameter are merely provided for the purpose of describing the specific example embodiment illustrated.

FIG. 4 is a flowchart illustrating a method, indicated generally at 150, by which network administrator 20 may allocate bandwidth in wireless mesh network 12. Method 150 begins at step 152 where network administrator 20 identifies information characterizing the topology of wireless mesh network 12. This topology information may indicate the configuration of wireless mesh network 12. In some embodiments, topology information specifies the number, location, and configuration of nodes 16. In particular embodiments, topology information can be used to determine the amount of interference at different places in wireless mesh network 12, whether the interference is caused by devices in wireless mesh network 12 such as nodes 16 or by external factors. In certain embodiments, the topology information is stored in network administrator 20 as network topology 60.

In step 154, network administrator 20 determines traffic information for wireless mesh network 12. Traffic information may indicate the traffic flow through different parts of wireless mesh network 12. In particular embodiments, traffic information details the average number of packets from each source node 16 to each destination node 16. The traffic information may contain a total quantity of traffic or a representation of relative network traffic between different nodes 16 in wireless mesh network 12. In certain embodiments, traffic information is stored in network administrator 20 as traffic matrix 62. In particular embodiments, step 154 occurs before or at the same time as step 152. Next, network administrator 20 calculates bandwidth assignments for links in wireless mesh network 12 at step 156. Network administrator 20 may use the traffic information and the topology information to calculate the bandwidth assignments. The bandwidth assignment for a link may indicate the desired bandwidth allocation to that link. In particular embodiments, network administrator 20 calculates bandwidth assignments for portions of wireless mesh network 12 that require traffic engineering; however, in other embodiments, network administrator 20 calculates a bandwidth assignment for each link in wireless mesh network 12. In certain embodiments, network administrator 20 stores bandwidth assignments in bandwidth data 66. A specific embodiment of calculating bandwidth assignments is illustrated and described with respect to FIG. 5.

Using the bandwidth assignments, network administrator 20 calculates a parameter for each node 16 at step 158. The parameter may affect the bandwidth available to respective node 16. In a particular embodiment, the parameter is a value for TXOP. Each node 16 uses its assigned TXOP value, which changes the bandwidth used by that node 16. A specific embodiment of calculating the parameters is illustrated and described with respect to FIG. 5. In step 160, network administrator 20 transmits the parameters to their respective nodes 16. This transmission may be accomplished in any appropriate manner. Network administrator 20 determines, in step 162, whether to update the parameters. In particular embodiments, this decision is made after reviewing data regarding the effectiveness of previous parameter allocations. In other embodiments, network administrator 20 evaluates whether or not to update the parameters based on differences in the level or constitution of traffic in wireless mesh network 12. If network administrator 20 determines to update the parameters, method 150 returns to step 154, where network administrator determines updated traffic information for wireless mesh network 12. However, if network administrator 20 determines not to update the parameters, method 150 ends.

The method described with respect to FIG. 4 is merely illustrative, and it is understood that the manner of operation and devices indicated as performing the operations may be modified in any appropriate manner. While the method describes particular steps performed in a specific order, it should be understood that wireless mesh network 12 contemplates any suitable collection and arrangement of elements performing some, all, or none of these steps in any operable order. For example, in some embodiments, network administrator 20 calculates more than one parameter for each node 16.

FIG. 5 is a flowchart illustrating a specific embodiment of a method, illustrated generally at 200, for calculating link bandwidth assignments and calculating parameters for nodes 16. Method 200 begins at step 202, where network administrator 20 formulates a linear programming problem using the traffic information and the topology information. In particular embodiments, network administrator 20 uses the traffic information determined from step 154 and topology information identified in step 152. The linear programming problem may be formulated as follows:

$$\max\ s \quad (1)$$

$$s.t. \sum_{e:t(e)=s(q)} x^q(e) \geq s \cdot r(q) \quad \forall\ q \quad (2)$$

$$\sum_{e:h(e)=v} x^q(e) = \sum_{e:t(e)=v} x^q(e) \quad \forall\ q, \forall\ v \in V \setminus \{s(q), d(q)\} \quad (3)$$

$$\sum_{e' \in E(t(e)) \cup E(h(e))} \frac{f(e')}{C(e')} \leq 1 \quad \forall\ e \in E \cup E^I \quad (4)$$

For notational convenience, the meaning of each symbol is explained below in Table 1.

TABLE 1

Symbols used in equations.

| | | | |
|---|---|---|---|
| V | set of vertices | s | Scaling factor |
| E | set of links | r | rate vector |
| $E^I$ | set of interference links | Q | # of source-destination pairs (sessions) |
| t(e) | transmitting node of link e | q | index of a session |
| h(e) | receiving node of link e | s(q) | source node of session q |
| f(e) | flows of all sessions over link e | d(q) | destination node of session q |
| F(v) | flows of all links from node v | r(q) | rate of session q |
| C(e) | channel capacity of link e | $x^q(e)$ | flow of session q over link e |
| TX(v) | size of TXOP at node v | w(v) | weight assigned to node v |

In certain embodiments, topology information includes V, E, $E^I$, and C(e), and traffic information is represented by the rate vector r, which indicates the solicited traffic load for each pair of source-destination nodes 16. These variables are inputs to the linear programming problem formulated above. Equations (2) and (3) conserve flow at the source and intermediate nodes 16, respectively. Equation (4) addresses the interference constraint on traffic flow in wireless mesh network 12, where $$f(e') = \sum_q x^q(e')$$

represents the sum of flows of all commodities passing over link e'. For a pair of nodes 16 within each other's interference range, the sum of channel utilization of each link associated with either node 16 should be less than or equal to 1. The desirable link rate, f(e), of each link e may be obtained by solving the linear programming problem represented by Equations (1) through (4), as shown by step 204. In certain embodiments, this value is stored in bandwidth data 66.

In step 206, network administrator 20 estimates the expected throughput of nodes 16. In the illustrated embodiment, nodes 16 communicate in accordance with 802.11 wireless communication protocols, and network administrator 20 uses TXOP as the parameter to allocate bandwidth in wireless mesh network 12. In particular embodiments, network administrator 20 restricts nodes 16 to the same TXOP for all outgoing links so that it can simplify the computation by using the throughput of nodes 16 rather than the throughput of each link. However, in other embodiments, network administrator 20 does not restrict nodes 16 to the same parameter for all outgoing links.

The portion of bandwidth allocated to one of nodes 16, v, may be expressed as:

$$\frac{w(v) \cdot TX(v)}{\sum_{i \in N^I(v)} w(v) \cdot TX(v)} \cdot C \quad (5)$$

Where v is a node, TX(v) is the TXOP value for node v, and w(v) is the frequency of successfully accessing the channel. Since node v needs to share the channel with all the nodes in the neighborhood $N^I(v)$ within its interference range, the portion of bandwidth allocated to node v may be related to: (1) the probability, w(v), of it successfully grabbing the channel and (2) how long (i.e., TXOP) it transmits data each time it successfully grabs the channel.

In step 208, network administrator 20 determines the frequency of a node v successfully accessing the channel, w(v). In certain embodiments, the physical meaning of w(v), the weight of the node v, is the number of occurrences that the node v acquires the transmission opportunity during a long period of time. In the case of single-hop networks, where the interference neighborhood includes every node, the weights may be the same for all nodes as each node may have an equal opportunity to send data. In particular embodiments, network administrator 20 simplifies the estimation of w(v) when nodes 16 form a multi-hop network. Network administrator 20 may assume that all nodes 16 within the interference range of a particular node 16 approximately form a single-hop network. Based on a Markov chain model derived for single-hop networks, the average interval between two successful access of medium (without considering the freezing idle period) is:

$$T = \frac{W}{2}\left[\frac{1 - (2p)^m}{1 - 2p} + \frac{(2p)^m}{1-p}\right] \quad (6)$$

where W is the initial maximum contention window, m is the maximum backoff stage, and p is the probability of collision. Both T and p are related to the number of nodes 16 in the particular node's 16 interference range, which depends on the network topology. In other words, if a node 16 is in an area with many other nodes 16, the interval between two successful accesses to the channel will be longer. The parameter w(v) may be estimated as the reciprocity of interval T(v). In certain embodiments, network administrator 20 uses any suitable technique, formula, algorithm, and/or method to determine the frequency of a node v successfully accessing the channel, w(v).

In step 210, network administrator 20 identifies an inequality to use to solve for the TXOP value for each node 16. In some embodiments, network administrator 20 calculates TXOP for nodes 16 by equating the expected node throughput (shown in Formula (5)) to the load of the corresponding node 16, $F(v) = \Sigma_{e:t(e)=v} f(e)$, where f(e) was determined in step 204. In single-hop networks, the denominator of the expected node throughput formula (shown in Formula (5)) may be the same for all nodes. If the denominator is the same, the value of TXOP for a particular node 16 may simply be proportional to the load of the corresponding node 16, F(v).

In particular embodiments, for example those containing multi-hop networks, the TXOP calculation may be simplified by maximizing an inequality. In certain embodiments, network administrator 20 aims to treat the bandwidth allocated to each node 16 in a fair manner. Accordingly, another scaling factor s' may be introduced to ensure the bandwidth allocated to each node 16 is at least a portion of the load of the corresponding node 16, F(v). The following inequality may be solved to obtain the TXOP parameter for each node 16:

$$\max \quad s' \quad (7)$$

$$s.t. \quad \frac{w(v) \cdot TX(v)}{\sum_{i \in N^I(v)} w(v) \cdot TX(v)} \cdot C \geq s' \cdot F(v) \quad \forall v \in V$$

$$TX(v) > 0 \quad \forall v \in V$$

In particular embodiments, network administrator 20 identifies this inequality by accessing and/or loading bandwidth algorithms 64. Once identified, network administrator 30 solves for a value of TXOP for each node 16. Then, method 200 ends.

Using these steps, network administrator 20 may calculate link bandwidth assignments and calculate parameters for nodes 16, thereby controlling the operation of nodes 16 to increase capacity and avoid congestion in wireless mesh network 12. However, the method described with respect to FIG. 5 is merely illustrative of a specific example embodiment, and it is understood that the manner of operation and devices indicated as performing the operations may be modified in any appropriate manner. While the method describes particular steps performed in a specific order, it should be understood that wireless mesh network 12 contemplates any suitable collection and arrangement of elements performing some, all, or none of these steps in any operable order. The steps described and formulas used may be modified in any appropriate manner to intelligently allocate bandwidth in a wireless mesh network.

Although the present invention has been described in several embodiments, a myriad of changes and modifications may be suggested to one skilled in the art, and it is intended that the present invention encompass such changes and modifications as fall within the present appended claims.

What is claimed is:

1. A method of allocating bandwidth in a wireless mesh network comprising:
   identifying topology information indicating a configuration of a plurality of wireless nodes and a plurality of wireless links interconnecting the wireless nodes to form a wireless mesh network;
   determining a traffic matrix for the wireless mesh network, the traffic matrix indicating, for each of the nodes to each of the other nodes as source node-destination node pairs, a relative traffic demand weighting for the source node-destination node pair as compared with each of the other source node-destination node pairs;
   calculating a bandwidth assignment for each wireless link using the topology information and the traffic matrix;
   calculating a parameter for each wireless node from the bandwidth assignments, the parameter affecting an amount of bandwidth used by the wireless node;
   transmitting each parameter to its corresponding wireless node.

2. The method of claim 1, wherein:
   calculating the bandwidth assignment comprises inputting the traffic matrix and the topology information into a linear programming problem, and
   the linear programming problem includes constraints specifying flow conservation at the wireless nodes and channel utilization of wireless links associated with a set of wireless nodes within an interference range.

3. The method of claim 1, wherein, for each wireless node:
   a load is equal to a sum of the bandwidth assignments for the wireless links originating at the wireless node; and
   the parameter corresponding to the wireless node causes the amount of bandwidth used by the wireless node to approximate the load.

4. The method of claim 1, wherein the wireless mesh network operates in accordance with IEEE 802.11 wireless communication protocols and the parameter is a value of transmission opportunity (TXOP).

5. The method of claim 1, further comprising:
   calculating routing tables from the traffic matrix, the routing tables directing traffic in the wireless mesh network over wireless links having less congestion;
   transmitting the routing tables to one or more of the wireless nodes.

6. The method of claim 1, wherein the relative traffic demand in the traffic matrix represents a historical average of an amount of traffic for each source node-destination node pair.

7. The method of claim 1, wherein the topology information indicates a number of the nodes, a location of the nodes, a communication distance for each of the nodes, and an interference distance for each of the nodes, the communication distance specifying an area over which each node can communicate, the interference distance specifying an area over which each node interferes with other communications.

8. The method of claim 1, wherein the topology information indicates, for each wireless node, a set of other wireless nodes that can interfere with transmissions sent by the wireless node and a level of interference caused by the set of other wireless nodes.

9. A network administrator for allocating bandwidth in a wireless mesh network comprising:
   a memory including:
      topology information indicating a configuration of a plurality of wireless nodes and a plurality of wireless links interconnecting the wireless nodes to form a wireless mesh network; and
      a traffic matrix for the wireless mesh network, the traffic matrix indicating, for each of the nodes to each of the other nodes as source node-destination node pairs, a relative traffic demand weighting for the source node-destination node pair as compared with each of the other source node-destination node pairs;
   a controller operable to calculate a bandwidth assignment for each wireless link using the topology information and the traffic matrix and to calculate a parameter for each wireless node from the bandwidth assignments, the parameter affecting an amount of bandwidth used by the wireless node; and
   a network interface operable to transmit each parameter to its corresponding wireless node.

10. The network administrator of claim 9, wherein:
    calculating the bandwidth assignment comprises inputting the traffic matrix and the topology information into a linear programming problem, and
    the linear programming problem includes constraints specifying flow conservation at the wireless nodes and channel utilization of wireless links associated with a set of wireless nodes within an interference range.

11. The network administrator of claim 9, wherein, for each wireless node:
    a load is equal to a sum of the bandwidth assignments for the wireless links originating at the wireless node; and the parameter corresponding to the wireless node causes the amount of bandwidth used by the wireless node to approximate the load.

12. The network administrator of claim 9, wherein the wireless mesh network operates in accordance with IEEE 802.11 wireless communication protocols and the parameter is a value of transmission opportunity (TXOP).

13. The network administrator of claim 9, wherein:
the controller is further operable to calculate routing tables from the traffic matrix, the routing tables directing traffic in the wireless mesh network over wireless links having less congestion; and
the network interface is further operable to transmit the routing tables to one or more of the wireless nodes.

14. The network administrator of claim 9, wherein the relative traffic demand in the traffic matrix represents a historical average of an amount of traffic for each source node-destination node pair.

15. The network administrator of claim 9, wherein the topology information indicates a number of the nodes, a location of the nodes, a communication distance for each of the nodes, and an interference distance for each of the nodes, the communication distance specifying an area over which each node can communicate, the interference distance specifying an area over which each node interferes with other communications.

16. The network administrator of claim 9, wherein the topology information indicates, for each wireless node, a set of other wireless nodes that can interfere with transmissions sent by the wireless node and a level of interference caused by the set of other wireless nodes.

17. A non-transitory computer-readable medium comprising logic for allocating bandwidth in a wireless mesh network, the logic operable when executed to:
identify topology information indicating a configuration of a plurality of wireless nodes and a plurality of wireless links interconnecting the wireless nodes to form a wireless mesh network;
determine a traffic matrix for the wireless mesh network, the traffic matrix indicating, for each of the nodes to each of the other nodes as source node-destination node pairs, a relative traffic demand weighting for the source node-destination node pair as compared with each of the other source node-destination node pairs;
calculate a bandwidth assignment for each wireless link using the topology information and the traffic matrix;
calculate a parameter for each wireless node from the bandwidth assignments, the parameter affecting an amount of bandwidth used by the wireless node;
transmit each parameter to its corresponding wireless node.

18. The non-transitory computer-readable medium of claim 17, wherein:
calculating the bandwidth assignment comprises inputting the traffic matrix and the topology information into a linear programming problem, and
the linear programming problem includes constraints specifying flow conservation at the wireless nodes and channel utilization of wireless links associated with a set of wireless nodes within an interference range.

19. The non-transitory computer-readable medium of claim 17, wherein, for each wireless node:
a load is equal to a sum of the bandwidth assignments for the wireless links originating at the wireless node; and
the parameter corresponding to the wireless node causes the amount of bandwidth used by the wireless node to approximate the load.

20. The non-transitory computer-readable medium of claim 17, wherein the wireless mesh network operates in accordance with IEEE 802.11 wireless communication protocols and the parameter is a value of transmission opportunity (TXOP).

21. The non-transitory computer-readable medium of claim 17, further operable to:
calculate routing tables from the traffic matrix, the routing tables directing traffic in the wireless mesh network over wireless links having less congestion;
transmit the routing tables to one or more of the wireless nodes.

22. The non-transitory computer-readable medium of claim 17, wherein the relative traffic demand in the traffic matrix represents a historical average of an amount of traffic for each source node-destination node pair.

23. The non-transitory computer-readable medium of claim 17, wherein the topology information indicates a number of the nodes, a location of the nodes, a communication distance for each of the nodes, and an interference distance for each of the nodes, the communication distance specifying an area over which each node can communicate, the interference distance specifying an area over which each node interferes with other communications.

24. The non-transitory computer-readable medium of claim 17, wherein the topology information indicates, for each wireless node, a set of other wireless nodes that can interfere with transmissions sent by the wireless node and a level of interference caused by the set of other wireless nodes.

25. A system for allocating bandwidth in a wireless mesh network comprising:
means for identifying topology information indicating a configuration of a plurality of wireless nodes and a plurality of wireless links interconnecting the wireless nodes to form a wireless mesh network;
means for determining a traffic matrix for the wireless mesh network, the traffic matrix indicating, for each of the nodes to each of the other nodes as source node-destination node pairs, a relative traffic demand weighting for the source node-destination node pair as compared with each of the other source node-destination node pairs;
means for calculating a bandwidth assignment for each wireless link using the topology information and the traffic matrix;
means for calculating a parameter for each wireless node from the bandwidth assignments, the parameter affecting an amount of bandwidth used by the wireless node;
means for transmitting each parameter to its corresponding wireless node.

* * * * *